July 13, 1954　　　　R. N. EDWARDS ET AL　　　　2,683,804
MEGAVOLTMETER FOR INDUCTION ELECTRON ACCELERATORS
Filed Feb. 14, 1951
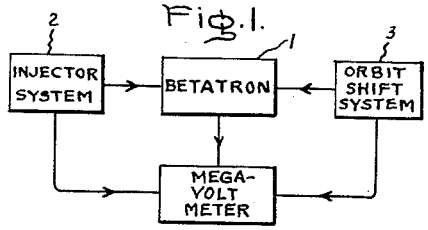
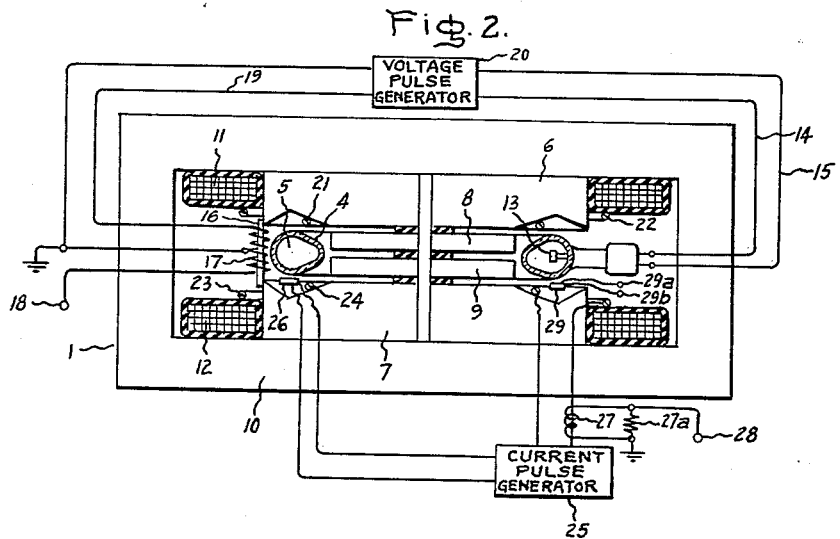
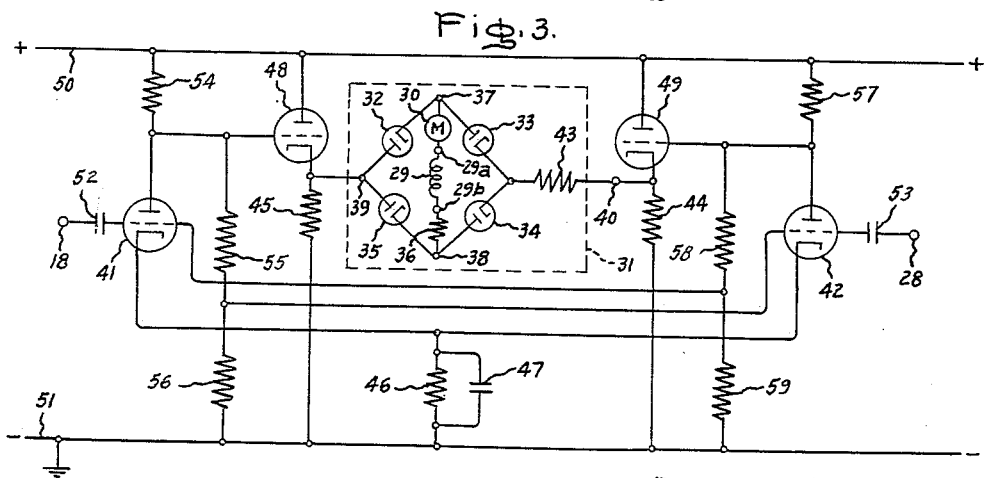
Inventors:
Russell N. Edwards,
Edmund E. Goodale,
Roland M. Lichtenstein,
by　Paul A. Frank
Their Attorney.

Patented July 13, 1954

2,683,804

UNITED STATES PATENT OFFICE 2,683,804

MEGAVOLTMETER FOR INDUCTION ELECTRON ACCELERATORS

Russell N. Edwards, Schenectady, Edmund E. Goodale, Scotia, and Roland M. Lichtenstein, Schenectady, N. Y., assignors to General Electric Company, a corporation of New York Application February 14, 1951, Serial No. 210,964

4 Claims. (Cl. 250—27)

Our invention relates to induction electron accelerators and, more particularly to the devices for indicating the energy level of electrons accelerated in induction electron accelerators. Because the energy level of moving electrons is commonly expressed in the energy unit of "electron volts," the aforementioned energy indicating devices will hereinafter be referred to as "megavoltmeters," although it is their function to indicate energy levels and not potential differences.

In an induction electron accelerator, for example, a betatron, electrons are accelerated in a generally circular orbital path by the electric field associated with a changing magnetic flux and kept in this path by a correspondingly changing magnetic guide field. The magnetic guide field is a sinusoidally cyclically varying field of constant frequency. The electrons are usually accelerated only during the rising part of the positive half cycles of the sinusoidally varying guide field, being injected into the acceleration path at an instant when the guide field flux is essentially zero but increasing positively, and being shifted from the acceleration path at an instant near the instant at which the guide field flux reaches its maximum positive, or "peak," value. At the desired point in the acceleration period, an orbit shift system or circuit may be energized to distort or move the electron orbit so that X-rays or other effects may be produced by the impact of electrons upon a target. It is desirable that the energy possessed by accelerated electrons be known in order that the effects of the moving electrons may be interpreted in terms of the energy involved.

It has been shown that the final energy of electrons shifted from the acceleration path is approximately proportional to the product of the radius of that orbital path and the guide field flux density at the instant of ejection. Since electrons are usually injected at a time when the guide field flux density is very small and since the radius of the acceleration orbit in any given accelerator is known, it remains to determine the change of guide flux density during the time of electron acceleration to determine the final energy of the electrons.

To accomplish this, the megavoltmeter circuits used heretofore employ a voltage pickup coil in the magnetic guide field serially connected with an indicating instrument in a circuit which is complete only while electrons are being accelerated. The deflection of the instrument is proportional to the average value of the current through it, which, at constant frequency, is proportional to the time integral of the current flowing through it. Since the current flowing through the instrument is instantaneously proportional to the voltage induced in the pickup coil, the deflection of the instrument is proportional to the time integral of the voltage induced in the pickup coil during each period of acceleration. The time integral of the induced voltage is in turn proportional to the change in flux during the acceleration period, so that the instrument may be calibrated directly in megavolts.

These presently used circuits employ a thyratron in series with the pickup coil for the connecting and disconnecting operations at the beginning and end of the acceleration periods and the circuits must be biased to neutralize the thyratron anode voltage drop in order that the megavoltmeter indication might be truly proportional to the time integral of the voltage induced in the pickup coil. Since a fixed bias is used, and the voltage drop in the thyratron sometimes varies, it is necessary that the voltage induced in the pickup coil be relatively high, say in the order of 600 volts, in order to minimize the effect of these variations on the reading of the megavoltmeter. This requires a large pickup coil in the guide field air gap.

In most applications of induction accelerators, the electrons are generally accelerated only during the rising part of the positive half cycles of the magnetic guide field during which time the voltage induced in the pickup coil is positive. However, it is often desirable to shift the electrons from the acceleration path after the guide field flux has started to decrease, i. e., after it has passed its positive peak value. Thus when the guide field flux starts to decrease, the thyratron in megavoltmeter circuits used heretofore is cut off, since the induced voltage in the pickup coil applied between the anode and cathode of the thyratron goes negative as soon as the flux starts to decrease, with the result that the instrument indications are inaccurate.

Therefore, an important object of our invention is to provide improved means for measuring the energy level of electrons shifted from the acceleration path in an induction electron accelerator.

Another object of our invention is to provide a megavoltmeter circuit in which the need for a large pickup coil and high pickup voltage is eliminated.

Still another object of our invention is to provide an improved megavoltmeter circuit capable of indicating electron energy levels for electrons shifted from the acceleration path after the crest of the magnetic guide field and during the negative half cycle of the induced pickup voltage.

In carrying out our invention in the preferred embodiment thereof, a microammeter is connected in a bridge type circuit formed of rectifier elements and is used to indicate the current in a pickup coil positioned in the guide field air gap of an induction electron accelerator. The input leads of the bridge circuit are controlled by an automatic voltage biasing circuit so that the microammeter can conduct current only during the time between injection and shifting of electrons.

While the present invention will be described as applied to a betatron, it is to be understood that it is not limited to such application, as the disclosure in this respect is merely illustrative for the purposes of explaining the inventive concept.

For additional objects and advantages, and for a better understanding of our invention, attention is now directed to the following description and the accompanying drawing, and also to the appended claims, in which the features of our invention believed to be novel are particularly pointed out.

In the drawing, Fig. 1 is a conventional box and line diagram of a betatron embodying our invention; Fig. 2 is a sectional elevation of a betatron, with associated electron injector and orbit shift systems shown partially in schematic form; and Fig. 3 is a schematic circuit diagram of a preferred embodiment of the megavoltmeter of our invention.

Referring to the drawing, a conventional induction electron accelerator, such as a betatron 1, is provided with a well known injector system 2, such as that disclosed in W. F. Westendorp Patent 2,394,071, granted February 5, 1946, for supplying the betatron with electrons at proper instants. Betatron 1 is also provided with a well known orbit shift system 3, such as that disclosed in D. W. Kerst Patent 2,394,070, granted February 5, 1946, for causing the accelerated electrons to leave the circular orbital acceleration path when they have attained the desired energy, and, thus, for causing them to strike some desired target. Betatron 1, as illustrated in Fig. 2, comprises a rotationally symmetrical evacuated glass vessel 4 which defines within its interior an annular chamber 5. The vessel 4 provides a circular orbit in which electrons may be accelerated to a high energy level, say in the order of several million electron volts.

The accelerating mechanism comprises a magnetic structure having generally circular laminated pole pieces 6 and 7 which are coaxial with the annular vessel 4. For decreasing the reluctance of the path between the center portions of the pole pieces, there is provided an insert in the form of two laminated iron disks 8 and 9 which are spaced from one another and from the other elements of the magnetic structure by insulating spacers. An externally closed magnetic circuit between the base portions of the pole pieces is provided by a rectangular iron core 10. The magnetic structure is excited by means of a pair of series-connected coils 11 and 12 which surround the pole pieces 6 and 7 and which are energized by an alternating voltage source, not shown, in such a manner as to provide a cyclically varying flux in the magnetic circuit.

Within the evacuated vessel 4, there is provided a suitable particle source, such as an electron gun 13, which, when properly heated and energized through conductors 14 and 15, serves to generate an intermittent stream of electrons. In order that electrons are injected into the acceleration path within vessel 4 at the proper instants, there is provided a metallic saturating magnetic link 16 connected across the air gap of the magnetic circuit. A center-tapped coil 17 is wound upon link 16 and is connected from the center tap to ground. Since link 16 is easily saturated, the magnetic flux passing through it changes appreciably only when the cyclically varying guide flux is near or passing through zero. The direction of the windings of coil 17 is chosen so that a negative voltage pulse appears between terminal 18 and ground, and a positive voltage pulse appears between conductor 19 and ground, each instant that the guide flux approaches and passes through zero while positively increasing. The positive pulses applied from coil 17 to a voltage pulse generator 20 actuate the pulse generator so that it excites electron gun 13, through conductors 14 and 15, to inject electrons into the acceleration path at the proper instants, as is explained more fully in the aforementioned Westendorp patent. The negative voltage pulses between terminal 18 and ground, occurring at the same instant that electrons are injected into acceleration path, are utilized in a manner to be hereinafter described.

In order that the electrons may be shifted from the acceleration path at the proper instants, four single turn series-connected coils 21, 22, 23 and 24 are positioned on the pole pieces 6 and 7 as shown and connected to a current pulse generator 25. Pulse generator 25 is actuated by a pickup coil 26 disposed in the path of the guide flux; it comprises a phase shifting circuit and a peaking transformer so arranged to momentarily energize the single turn coils at the proper instant in each guide flux cycle and distort the guide flux so that electrons are shifted from the acceleration path to strike a suitable target, not shown. This is explained more fully in the aforementioned Kerst patent.

A current transformer 27 is provided with its secondary winding around one of the output conductors of current pulse generator 25 and so connected with a load resistor 27a as to provide a negative voltage pulse between a terminal 29 and ground each instant that the single turn coils are energized and electrons are shifted from the acceleration path. These negative voltage pulses are utilized in a manner to be hereinafter described.

A second pickup coil 29 is disposed in the path of the guide flux as shown and provided with two terminals 29a and 29b. Coil 29 and terminals 29a, 29b, 28 and 18 appear in the schematic illustration of our invention shown in Fig. 3.

Referring now to Fig. 3, an indicating instrument, such as a microammeter 30, is connected in a bridge type circuit 31, shown enclosed by dashed lines. Bridge circuit 31 comprises four substantially identical rectifying elements, such as the vacuum diodes 32, 33, 34, and 35. Coil 29, microammeter 30, and a current limiting resistor 36 are serially connected across output terminals 37 and 38 of bridge circuit 31.

An electric circuit having two stable conditions in operation, such as an Eccles-Jordan trigger circuit or "flip-flop" circuit, is connected to input terminals 39 and 40 of bridge circuit 31. Switching action takes place in electron discharge devices 41 and 42 and biases the voltage applied to the bridge circuit in a direction to present the low impedance characteristics of the vacuum diodes to the aforesaid series circuit only while electrons are being accelerated in the evacuated vessel 4. When electrons are not being accelerated, bridge circuit 31 is biased to present the high impedance characteristics of the vacuum diodes to the aforesaid series circuit. During the time of acceleration of electrons in vessel 4, the voltage induced in pickup coil 29 by the changing guide flux drives a component of current through microammeter 30, vacuum diode 33, a current limiting resistor 43, a resistor 44, a resistor 45, vacuum diode 35, and a current limiting resistor 36. For voltage of opposite polarity induced in the pickup coil 29, i. e., after the peak of the guide flux when the flux is decreasing, the component of current flows similarly through vacuum diodes 32 and 34, but in the opposite direction through microammeter 30.

Devices 41 and 42 are provided with a common cathode resistor 46 which serves as a mutual self-biasing means and which may be paralleled with a stabilizing condenser 47. Since the various resistors required in this megavoltmeter circuit necessarily consume a certain amount of power, two electron discharge devices 48 and 49 are connected as cathode followers to draw additional current from the direct current supply conductors 50 and 51 (conductor 51 being at ground potential as shown) to compensate for this power loss and also to improve the biasing action of the triggering circuit. In effect, this constitutes an impedance transforming circuit connecting the bridge biasing circuit to the bridge type circuit. Devices 48 and 49 are respectively controlled by the action of devices 41 and 42 in the Eccles-Jordan trigger circuit. The cathodes of devices 48 and 49 are connected respectively to input terminals 39 and 40 of bridge circuit 31.

The Eccles-Jordan trigger circuit controlling the voltage input to bridge circuit 31 has only two stable conditions in operation. In one condition, the electron discharge device 41 is conducting anode current and applies a negative bias to the control electrode of electron discharge device 42, thereby locking device 42 in the non-conducting condition. In the second stable condition, device 41 is cut off and device 42 is conducting anode current. In order to switch the triggering circuit from one stable condition to the other, a negative voltage pulse must be applied to the control electrode of the conducting electron discharge device.

Microammeter 30 acts as integral indicating device responding to the average value of the current therethrough, which is proportional, at a constant frequency, to the integral of the voltage induced in pickup coil 29, which, in turn, is proportional to the change in the guide field flux density between the instants of electron injection and ejection during each cycle of the guide flux. These proportionalities permit microammeter 30 to be calibrated directly in megavolts (more accurately, mega-electron-volts) to indicate the energy level of the electrons accelerated. It is necessary, however, that microammeter 30 be allowed to conduct current only during the time interval of each flux cycle during which electrons are being accelerated. This is accomplished, since terminals 18 and 28 as shown in Fig. 2 are identical to terminals 18 and 28 as shown in Fig. 3, by the negative voltage pulses induced in coil 17 at the instant of electron injection being applied, through a condenser 52, between the control electrode of device 41 and ground; and similarly by the negative voltage pulses caused by current transformer 27 across resistor 27a at the instant of electron shift being applied, through a condenser 53, between the control electrode of device 42 and ground.

During operation, an alternating voltage of some value, in the order of 30 volts, is induced in pickup coil 29 by the guide field flux. This voltage is continuously applied to terminals 29a and 29b, but no effect is produced on microammeter 39 except during the time interval for which the low impedance characteristics of the vacuum diodes of grid circuit 31 are presented and current is allowed to flow through the coil 29. Assume that the initial conditions are those with device 41 conducting anode current and no electrons being accelerated, i. e., that the guide flux is in its negative half cycle. At the same instant that coil 17 supplies a positive voltage pulse to pulse generator 20 causing cathode 13 to inject electrons into the acceleration path, coil 17 also supplies a negative voltage pulse between the control electrode of electron discharge device 41 and ground. This negative voltage pulse causes device 41 to cease conducting anode current. The decreased anode current through a resistor 54 produces a lower voltage drop thereacross and a higher voltage drop across resistors 55 and 56. This results in a higher potential at the control electrodes of electron discharge devices 42 and 48. The more positive bias on device 48 causes it to draw more anode current, thereby raising the potential of the cathode of device 48 with respect to ground because of the increased voltage drop across resistor 45. The more positive bias on device 42 causes it to start conducting anode current, thereby increasing the voltage drop across a resistor 57, and decreasing the voltage drop across resistors 58 and 59. The decreased voltage drop across resistors 58 and 59 causes the control electrode of electron discharge device 49 to be driven more nearly negative, and also causes the control electrode of electron discharge device 41 to be driven even more nearly negative, locking device 41 to anode current cutoff. The decreased positive bias on electron discharge device 49 causes it to draw less anode current, thereby decreasing the voltage drop across resistor 44, and lowering the potential of its cathode. It is seen, therefore, that input terminal 39 of bridge circuit 31 increases in potential, while input terminal 40 decreases in potential when electrons are injected into the betatron. This action causes the vacuum diodes to present their low impedance characteristics, thereby permitting current flow therethrough, and permitting the component of current due to the voltage induced in coil 29 to flow through the path hereinbefore described.

At the instant current pulse generator 25 supplies a surge of exciting current to coils 21, 22, 23, and 24, to cause electrons to be shifted from the acceleration path, current transformer 27 applies a negative voltage pulse between the control electrode of electron discharge device 42 and ground. This negative pulse cuts off anode current flow through device 42, thereby decreasing the voltage drop across resistor 57 and applying a more positive potential to the control electrodes of electron discharge devices 41 and 49. The more positive potentials on these control electrodes cause device 41 to start conducting anode current and device 49 to draw considerably increased anode current. The increase in anode current through device 49 increases the voltage drop across resistor 44 which in turn increases the potential of input terminal 40. The anode current flowing through device 41 increases the voltage drop across resistor 54 and decreases the potential applied to the control electrode of device 48. Thus, the anode current flowing through device 48 decreases, the voltage drop across resistor 45 decreases, and the potential at input terminal 39 decreases. Therefore, the negative voltage pulse applied between the control electrode of device 42 and ground results in the input terminal 39 being driven negative in potential with respect to input terminal 40 so that no current can flow through the rectifying elements of bridge circuit 31. When the next negative pulse is supplied between the control electrode of device 41 and the ground, the cycle of operation will be repeated as just described.

It is seen, therefore, that the operation of our circuit makes input terminal 39 positive with respect to input terminal 40 during the time interval that electrons are being accelerated within an induction electron accelerator, and conversely, makes input terminal 39 negative with respect to input terminal 40, so that no current can flow through the rectifying elements of the bridge circuit at other times.

While electrons are being accelerated, a steady current, supplied by the biasing circuit, will flow through the arms of the bridge circuit between input terminals 39 and 40. But since the rectifying elements are substantially identical, this steady current will divide evenly between the two paths afforded by the bridge and cause neither any voltage drop nor any current flow between output terminals 37 and 38. Thus the current flowing through microammeter 30 and the aforementioned circuit for microammeter current will be solely the result of the voltage induced in pickup coil 29 by the changing guide flux density.

Since the voltage induced in pickup coil 29 is alternating, the negative voltage bias applied to bridge circuit 31, i. e., the amount by which input terminal 39 is negative in potential with respect to input terminal 40 during periods when no electrons are being accelerated, must be made at least equal to the peak value of the voltage induced in pickup coil 29 by the cyclically varying guide field.

While the present invention has been described by reference to a particular embodiment thereof, it will be understood that this is by way of illustration of the principles involved, and that those skilled in the art may make many modifications in the arrangement and mode of operation. Therefore, we contemplate by the appended claims to cover any such modifications as fall within the true spirit and scope of this invention.

What we claim as new and desire to secure by Letters Patent of the United States is:

1. For use with an orbital induction electron accelerator having a cyclically varying magnetic guide field, an injector system for injecting electrons along an orbital path within said induction electron accelerator and an orbit shift system for shifting electrons from said orbital path, a device for indicating the energy level of electrons shifted from said path comprising a plurality of rectifying elements, a bridge type circuit formed by said rectifying elements, an electric indicating instrument connected between a pair of oppositely disposed terminals of said bridge type circuit and responsive to current therethrough, a pickup coil disposed in the path of said guide field flux and connected between said previously mentioned pair of oppositely disposed terminals of said bridge type circuit in series circuit relation with said instrument for having a voltage induced therein in response to the changing magnitude of said guide field, an electrical biasing circuit having two conditions of stable operation and at least two input connections for switching the circuit from one of its conditions of stable operation to the other, means for connecting one of the input connections of said biasing circuit to said injector system, means for connecting the remaining input connection of said biasing circuit to said orbit shift system whereby the conditions of stable operation of said biasing circuit are shifted in response to the injection of electrons into said orbit and to the shifting of electrons from said orbit, and a circuit connecting said biasing circuit connections to the remaining oppositely disposed terminals of said bridge type circuit for biasing said bridge type circuit positively and negatively in response to changes in the condition of stable operation of said biasing circuit.

2. For use with an orbital induction electron accelerator having a cyclically varying magnetic guide field, means for injecting electrons into an orbital acceleration path within said induction electron accelerator and means for shifting electrons from said orbital path, a megavoltmeter for indicating the energy level of electrons shifted from said orbit comprising a plurality of identical rectifying elements, a bridge type circuit formed by said elements and having input terminals and output terminals, an electric indicating instrument responsive to currents therethrough, a pickup coil disposed in the path of said magnetic guide field, said instrument connected in series relation with said pickup coil, said series combination connected across said output terminals of said bridge type circuit, said pickup coil having voltage induced therein in response to changes in magnitude of said guide field, an electric biasing circuit having two stable conditions of operation and at least two input and output connections for switching the circuit from one of its conditions of stable operation to the other, means for connecting one of the input connections of said biasing circuit to said electron injecting means, means for connecting the remaining input connection of said biasing circuit to said electron orbit shifting means whereby the condition of stable operation of said biasing circuit is shifted in response to respective signals from said injection means and said electron orbit shifting means, and an impedance transforming circuit for connecting each of the output terminals of said biasing circuit to the responsive input terminals of said bridge type circuit for improving the operation of said biasing circuit with respect to said bridge type circuit, and for biasing said bridge type circuit positively and negatively in response to changes in the condition of stable operation of said biasing circuit.

3. An instrument for measuring a desired portion only of a cyclically varying inductive field which comprises a rectifier bridge comprised of four rectifier elements and having two output terminals, each output terminal being formed by the juncture of the positive and negative electrodes respectively of two rectifier elements, said rectifier bridge having two input terminals, a positive input terminal being formed by the juncture of the positive electrodes of two rectifier elements and a negative input terminal being formed by the juncture of the negative electrodes of two rectifier elements, an inductive pick up coil adapted to be inserted in the cyclically varying inductive field to be measured and an indicating instrument connected in series circuit relationship between the output terminals of said bridge circuit, a flip-flop multivibrator circuit comprised of a pair of grid controlled electron discharge devices, means for operatively coupling the plate electrode of one of said electron discharge devices to the positive input terminal of said rectifier bridge, means for operatively coupling the control electrode of said last-mentioned electron discharge device to a source of control electric signal for initiating operation of the instrument, means for operatively coupling the plate electrode of the remaining electron discharge device of said flip-flop multivibrator to the negative input terminal of said rectifier bridge, and means for operatively coupling the control electrode of said last-mentioned electron discharge device to a source of control electric signals for terminating operation of the instrument.

4. An instrument for measuring a desired portion only of a cyclically varying inductive field which comprises a rectifier bridge comprised of four rectifier elements and having two output terminals, each output terminal being formed by the juncture of the positive and negative electrodes respectively of two rectifier elements, said rectifier bridge having two input terminals, a positive input terminal being formed by the juncture of the positive electrodes of two rectifier elements and a negative input terminal being formed by the juncture of the negative electrodes of two rectifier elements, an inductive pick up coil adapted to be inserted in the cyclically varying inductive field to be measured and an indicating instrument connected in series circuit relationship between the output terminals of said bridge circuit, a flip-flop multivibrator circuit comprised of a pair of grid controlled electron discharge devices, a first cathode follower amplifier, means for operatively coupling the plate electrode of one of the electron discharge devices of said multivibrator to the input of said cathode follower amplifier and for coupling the control electrode thereof to a source of control electric signals for initiating operation of the instrument, means for coupling the output of said cathode follower to the positive input terminal of said rectifier bridge, a second cathode follower amplifier, means for operatively coupling the plate electrode of the remaining electron discharge device of said multivibrator to the input of said second cathode follower amplifier and for coupling the control electrode thereof to a source of control electric signals for terminating operation of the instrument, and means for coupling the output of the second cathode follower amplifier to the negative input terminal of the rectifier bridge.

References Cited in the file of this patent

UNITED STATES PATENTS

| Number | Name | Date |
|---|---|---|
| 2,252,059 | Barth | Aug. 12, 1941 |
| 2,484,587 | Rich | Oct. 11, 1949 |

OTHER REFERENCES

"Electronics Applied to the Betatron," by Dietze and Dickinson; Proc. IRE., vol. 37, No. 10, October 1949, pages 1171–1178.